No. 830,204. PATENTED SEPT. 4, 1906.
J. M. BOYLE.
METHOD OF MAKING HOLLOW OBJECTS, CONDUITS, &c.
APPLICATION FILED SEPT. 21, 1905.
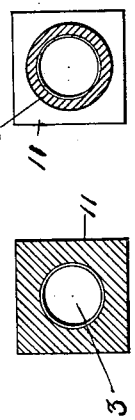
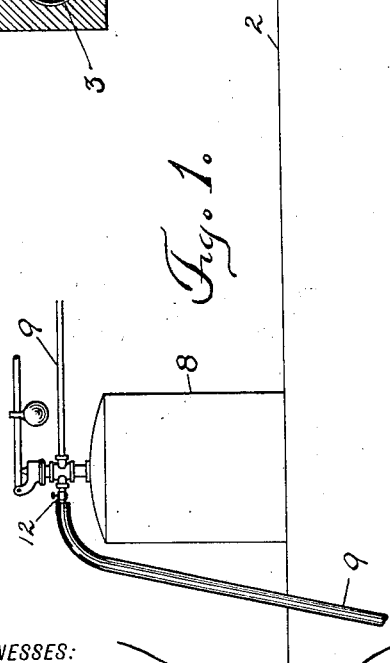
WITNESSES:
INVENTOR
James M. Boyle
BY
Townsend & Decker
ATTORNEYS.

UNITED STATES PATENT OFFICE.

JAMES M. BOYLE, OF NEW YORK, N. Y., ASSIGNOR OF ONE-HALF TO F. W. ROLLER, OF NEW YORK, N. Y.

METHOD OF MAKING HOLLOW OBJECTS, CONDUITS, &c.

No. 830,204.  Specification of Letters Patent.  Patented Sept. 4, 1906.

Application filed September 21, 1905. Serial No. 279,389.

*To all whom it may concern:*

Be it known that I, JAMES M. BOYLE, a citizen of the United States, and a resident of New York, in the county of New York and State of New York, (whose post-office address is 203 Broadway,) have invented certain new and useful Improvements in Methods of Making Hollow Objects, Conduits, &c., of which the following is a specification.

The invention relates to the manufacture of hollow objects, such as pipes, tubes, or conduits or posts, columns, or cylinders having an internal bore.

The principal of the invention depends upon the capability of the inflated distensible body of flexible material to serve as a core or inner mold for a plastic material which is applied to the exterior thereof and allowed to harden, the fluid-pressure in the mold being afterward released.

The invention consists in the methods of making hollow objects or, specifically, continuous conduits or of continuously making separate conduits, all as more particularly set forth in the following specification, and pointed out in the claims.

The object of the invention is, among other things, to remove certain objections incident to the present constructions and methods of laying, and more particularly to avoid the presence of joints at frequent intervals, such as are found in conduits built up from short sections of previously-manufactured tile or earthenware or other duct laid end to end in a trough or trench, to eliminate the necessity for using manholes, junction-boxes, or short junction-sections where there is a sudden change of direction—as, for instance, where there is a sudden large change of grade—and to secure other advantages in the completed or laid conduit, which will be apparent to those skilled in the art.

While my invention is applicable to conduits laid under ground or under water, it is also useful in the making and laying or installing of conduits in other situations—as, for instance, in building or other structures. In the following description, however, the invention will be described in connection with the laying and making of an underground conduit.

In the accompanying drawings, Figure 1 is a general side elevation and diagrammatic view illustrating the method of using apparatus that may be employed according to my invention for laying and completing an under-ground conduit. Fig. 2 is a cross-section of a completed conduit. Fig. 3 is a cross-section of a modified conduit.

1 indicates the bottom of a trench or trough, in this case dug in the earth, the surface of which is indicated by the line 2.

3 indicates the flexible tube, which, in the best manner of carrying out my invention, is also collapsible. Said tube is preferably made, therefore, of some rather thin flexible material, which is also preferably an insulator—as, for instance, rather thin tough paper, which should be as thin as practicable and which may be treated to give it a lubricating-surface on its interior or to render it waterproof. When made of collapsible material, said tube may be compactly wound upon a reel 4, mounted on a suitable portable stand 5, and may be paid out from said reel through suitable compression devices, which will act as a closure to prevent the air or other fluid under pressure in the paid-out portion from working back into the reeled portion of the tube. As a convenient means for maintaining such compression I show a pair of compression-rolls 6, which may also be feed-rolls, for drawing the tube off the reel through the application of power applied to the feed-rolls from a crank 7, belted up to said rolls.

For the purpose of distending the tube or preventing it from collapsing by the pressure of cement I prefer to employ air-pressure, which may be obtained from a suitable tank 8, located in any convenient position and kept supplied with air from the pipe 9, joined to a proper compressor. From the tank 8 the air is conveyed to the tube from a pipe 9, furnished at its end with a suitable plug or coupling 10, adapted to form an air-tight connection with the end of the tube 3, which by preference is the end where the construction is started. The cement forming the structore of the completed tube is indicated at 11. In the operation of the apparatus and assuming that the construction is started from the end 3' of the tube 3 there would be first provided, preferably, a bed of suitable material upon which the tube would be laid as it is paid out from the reel 4. This bed may be a layer of cement of the same kind as the bed of cement which is subsequently filled around the tube. Any desired length of tube 3 may be laid by moving the portable reel to the required position and at the same time paying out the tube, and said tube may be carried around bends, corners, or curves, and, if desired, through manholes or other spaces where the continuity of the cement is interrupted. During such operation the tube may or may not be distended by pressure from the tank 8. After a predetermined length of the tube has been laid the desired cement 11 is filled in or poured in around the same and permitted to harden, the internal pressure being maintained at such time to cause the tube to be distended and serve as a mandrel or core for forming the bore of the conduit. This pressure may be maintained for a greater or less time, as desired, but in any case should be maintained until the cement has set sufficiently to retain the form given to it by the distention of the tube. When sufficiently hardened, the air or other distending fluid may be allowed to escape from the interior of the flexible tube, thus leaving a completed cement conduit with a single duct.

It is obvious that the conduit may be formed with as many ducts as required or desired by laying a number of paper tubes 3 beside one another and that the conduit may be built up in tiers by finishing one layer and subsequently laying thereon a row of tubes 3 for the next tier or layer.

It is obvious that when the tube 3 is continued through space void of cement the said tubes at such points may be removed after the operation has been completed and separated conduits thus made.

It is also obvious that the conduit may be laid and completed section by section by paying out the tube 3 to any desired length, finishing the filling in of the cement up to the feel or frame 5 and then moving the latter along to lay a further length of tube 3 and then filling in the cement over the additional laid portion of tube 3.

As will be obvious, there is practically no limit to the length of cement tubing, practically continuous, which may be laid by this method, since it is possible to employ reels of very large capacity or to substitute a full reel for an exhausted one and to couple the tubes 3 together by proper cement adapted to unite the paper or other material of which the tube 3 is composed. During the operation of joining the tubes 3 at such time the air may be permitted to escape from the first-laid portion or tube by withdrawing the couple or plug 10, at which time a suitable stop-cock 12 at the tank 8 should be shut.

When the conduit is used for electric cables, is is sometimes desirable to provide for a breaking or tearing away of the paper lining by the abrasion due to drawing the cable through, which is liable to take place when the tubing is made of thin paper, which is the preferred kind of tubing employed. In this case in order to insure a conduit-lining having an extra hard or smooth surface to take the wear produced by pulling in and out cables I prefer to apply a preliminary coating of a special cement having the desired qualities to the tube before filling in the cement around the same. This lining layer is indicated in Fig. 3 by the numeral 13. It may be applied by hand over the collapsible tube while in distended condition to form a uniform layer over the same, after which the cement 11 may be applied. The latter takes its exterior form from the sides of the trough or trench in which the tube 3 is laid.

In the foregoing description and the following claims the term "flexible tube" is used to mean a tube which is capable of being bent around angles, curves, or corners, so that it may change direction without the use of elbows, segments, or other junction-pieces.

What I claim as my invention is—

1. The method of making a hollow object, which consists in first paying out a predetermined length of distensible flexible tubing; second, closing said tubing at the extremity of said predetermined length; third, inflating the portion of said tubing thus paid out; fourth, applying to the exterior of said portion a plastic material capable of hardening and permitting same to harden; fifth, removing the inflating pressure and separating the remainder of said tube from the portion inclosed in said plastic material.

2. The method of making a continuous conduit, which consists in paying out successive lengths of distensible flexible tubing; closing said tubing at the end of each length as it is successively paid out; inflating said lengths successively and applying to each length in turn plastic material capable of hardening.

3. The method of making a continuous conduit, which consists in first, laying a flexible distensible tube in the line of the finished conduit and temporarily closing said tube at a distance from its end; second, inflating the portion of said tube between said closure and said end; third, applying a plastic material capable of hardening by setting to said portion of said tube and allowing same to harden; fourth, temporarily closing said tube at a distance from said first closure and releasing said first closure to permit said second portion of said tube to become inflated; fifth, applying said plastic material to said second portion of said tube and so on continuously.

4. The method of making hollow objects, which consists in first placing in position a flexible distensible tube; second, inflating said tube; third, applying to a predetermined portion of said tube a plastic material capable of hardening by setting; fourth, applying said material to another predetermined portion of said tube distant from said first portion; and fifth, removing the uncovered tube between said covered portions.

5. The method of making and lining a hollow object, which consists in first placing in position a flexible distensible tube of the selected lining material closed at one end; second, inflating said tube; third, applying to said tube a plastic material capable of hardening and permitting same to harden; fourth, opening both ends of said inclosed tube.

6. The method of making a hollow object, which consists in first placing in position a flexible distensible tube closed at one end; second, inflating said tube; third, applying to said tube a plastic material capable of hardening to produce a smooth surface on the interior of the cylinder and permitting same to harden; and fourth, coating said hardened material with additional plastic material to produce a wall of desired thickness.

Signed at New York, in the county of New York and State of New York, this 20th day of September, A. D. 1905.

JAMES M. BOYLE.

Witnesses:
  H. C. TOWNSEND,
  C. F. TISCHNER, Jr.